June 13, 1933.  J. P. HEIL ET AL  1,913,633
PUMP CONSTRUCTION
Filed April 27, 1929    2 Sheets-Sheet 1
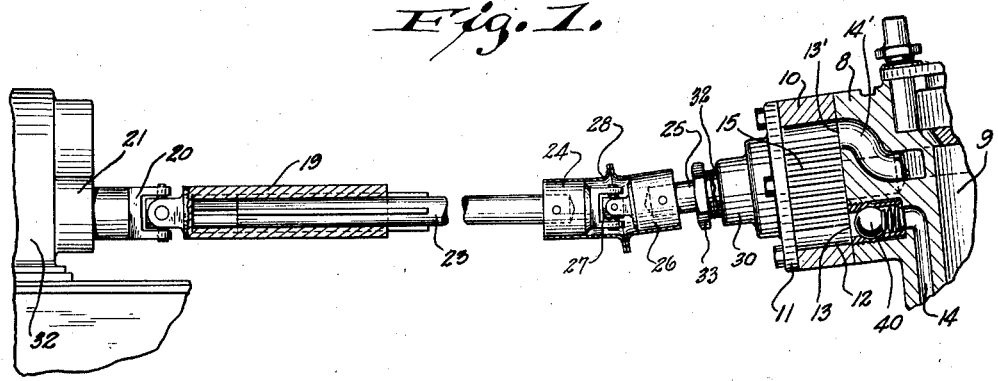
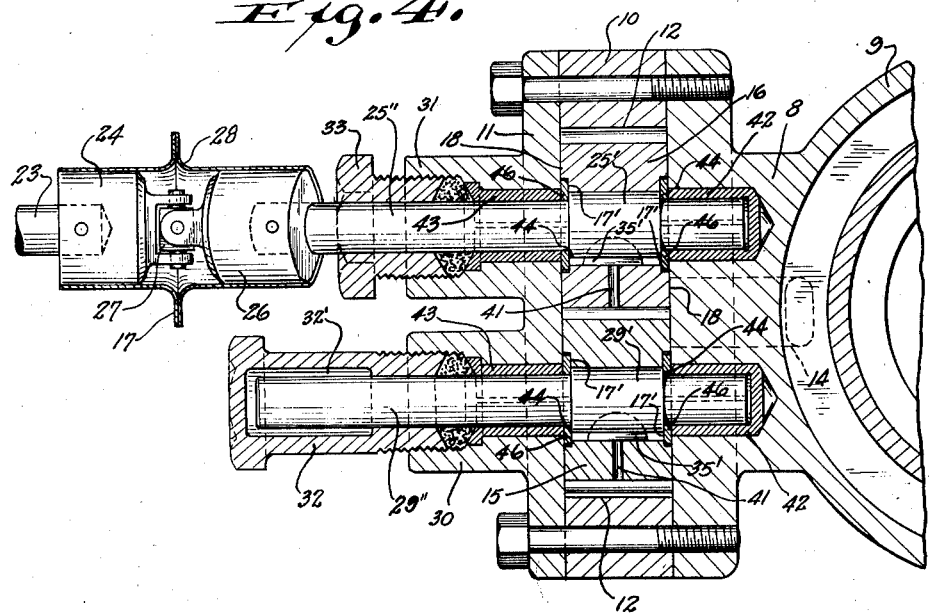
INVENTORS
Julius P. Heil,
Charles G. Eisenberg Jr., +
BY George Leo Landry
Morsell, Keeney + Morsell
ATTORNEYS June 13, 1933.   J. P. HEIL ET AL   1,913,633
PUMP CONSTRUCTION
Filed April 27, 1929   2 Sheets-Sheet 2
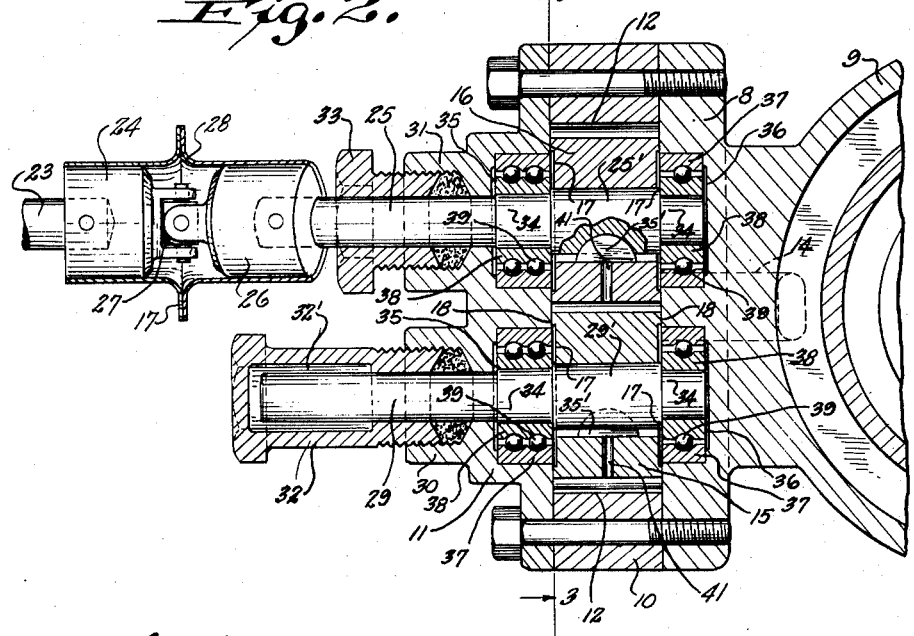
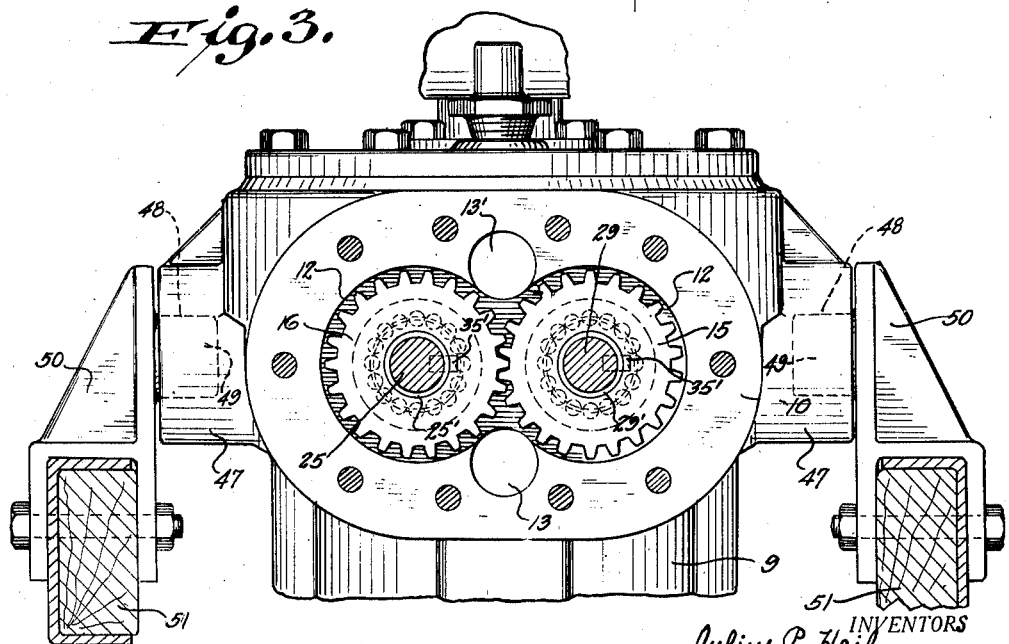

Patented June 13, 1933

1,913,633

UNITED STATES PATENT OFFICE

JULIUS P. HEIL AND CHARLES G. EISENBERG, JR., OF MILWAUKEE, AND GEORGE LEO LANDRY, OF WEST ALLIS, WISCONSIN, ASSIGNORS TO THE HEIL CO., OF MILWAUKEE, WISCONSIN, A CORPORATION OF WISCONSIN

PUMP CONSTRUCTION

Application filed April 27, 1929. Serial No. 358,630.

This invention relates to improvements in pump construction, and more particularly to a pump construction for fluid hoists.

Fluid hoists for dump trucks are usually operated by gear pumps which are adapted to force oil above or below the pistons operating the raising and lowering mechanism of the hoist. One of the gears of the gear pump is usually connected to the transmission of the truck by means of an elongated splined shaft, and the shaft is provided with universal joints to permit the tilting of the pump, in raising or lowering the body of the truck. Inasmuch as the distance between the pump and the transmission increases and diminishes with the movement of the body it is necessary to have the shaft of a splined or sliding formation, and the splined engagement is usually in the connection between the pump shaft and the transmission. In use, it has been found that the sliding connection between the pump shaft and the transmission, while turning to raise or lower the body of the truck, creates considerable friction in the sliding or splined connection, which friction is imparted to one or the other faces of the gear to which the pump shaft is connected.

It is, therefore, the primary object of the present invention to provide a pump construction in which the pump gears are floatingly mounted on their shafts within the pump casing whereby end thrust and frictional engagement, occasioned by movements of the gear shaft, between the faces of the gears and the pump casing walls is eliminated, whereby the pump will function more freely and efficiently than heretofore and excessive wear on the gear faces and casing is overcome.

A further object of the invention is to provide a gear pump construction in which the shafts on which the gears are mounted may be readily interchanged if desired.

A further object of the invention is to provide a pump construction which is very simple and efficient, is strong and durable, and is well adapted for the purposes described.

With the above and other objects in view the invention consists of the improved pump construction, and its parts and combinations as set forth in the claims, and all equivalents thereof.

In the accompanying drawings in which the same reference characters indicate the same parts in all of the views:

Fig. 1 is a longitudinal sectional view of a pump gear shaft between the transmission take off and the pump, fragmentary portions of said members being shown;

Fig. 2 is an enlarged horizontal sectional view of a portion of a gear pump and the adjacent gear shaft portions and connections;

Fig. 3 is a sectional view taken on line 3—3 of Fig. 2; and

Fig. 4 is a view similar to Fig. 2 only illustrating a slight modification of the invention.

Referring now more particularly to the drawings it will appear that the numeral 8 indicates a conduit casing adapted to be connected to the hoisting cylinders 9 of a hydraulic dump truck and said conduit casing has attached thereto a pump casing 10 having a front cover portion 11. Said casing 10 is formed with two intersecting gear chambers 12, of which the conduit casing 8 forms one inner flat face thereof. The gear chambers are of circular formation, and at the upper and lower points of intersection of the curves, inlet and outlet fluid openings 13 and 13' respectively are provided which communicate with fluid ducts 14 and 14' formed in the conduit casing. Intermeshing pump gears 15 and 16 are positioned comparatively snugly within the gear chambers and have, with the exception of shallow recesses 17, flat faces 18 which are in juxtaposition to the flat faces of the chambers.

For the purpose of driving one of the gears of the gear pump, as gear 16, an elongated jointed connection is provided which includes at one end portion a sleeve 19 having a universal joint connection 20 with the take off 21 of the truck transmission 22. Splined to said sleeve is an elongated shaft 23 secured at its other end to a cylindrical member 24. A short shaft 25 extends outwardly of the pump casing 10 and its outer end portion is secured to a cylindrical member 26.

Said cylindrical members 24 and 26 have universal joint connections 27 with each other and are covered by a flexible or fabric dirt protecting member 28.

A particular feature of the invention resides in the manner in which the pump gears 15 and 16 are mounted respectively on a stud shaft 29 and the driving shaft 25. The cover 11 of the pump casing is formed with bushings 30 and 31 into which are threaded stuffing boxes 32 and 33 and the shaft 25 extends through its stuffing box 33 into and centrally through the gear chambers 12, while the shaft 29 has its outer end portion disposed within a recess 32' in the stuffing box 32 and extends into and centrally through its gear chamber 12.

In the specific embodiment of the invention illustrated in Figs. 2 and 3 the inner portions of the shafts 29 and 25 are enlarged as at 29' and 25' with slightly reduced portions 34 there adjacent. The gears 15 and 16 are slidingly or floatingly mounted on said shaft portions 29' and 25' and are keyed thereto by Woodruff keys 35'. Within recesses 35 and 36 formed respectively in the cover 11 and the conduit casing 8 about the slightly reduced portions 34 of the shafts 29 and 25 are fixed outer ball races 37 and revoluble inner ball races 38 between which are bearing balls 39 disposed in suitable grooves. It will be noted that the shoulders formed at the junction of the shaft portions 25' and 29' with the portions 34 abut against the ball races 38.

The hoisting cylinders 9 are provided with laterally projecting portions 47 having recesses 48 into which trunnions 49 extend, said trunnions being formed on brackets 50 secured to side frame members 51 of the truck, so that in their mounting on the truck chassis, during lifting and lowering movements of the truck body, said cylinders may tilt or pivot. During lifting movements of the truck body the splined shaft 23 will slide outwardly with respect to its sleeve 19 and the entire gear drive will bow upwardly at the universal joint 27 with the result that the shaft 25 exerts a pronounced pull and ordinarily, the gear mounted thereon will frictionally engage the inner face of the cover 11, and its movement will be retarded and wear will occur. However, due to the mounting of the gear 16 on the shaft portion 25', so that it may slide slightly thereon, the pull on the shaft is not transmitted to the gear, and it is relieved of undue frictional engagement with the inner face of the cover 11.

Similarly, when the truck body is being lowered there is a tendency for the shaft 25 to exert an end thrust which ordinarily would cause the gear 16 to bear unduly against the inner face of the portion 8. However, the floating mounting of said gear relieves it from this undesired frictional engagement.

It is, of course, apparent that the gear 15 is free to move somewhat on its shaft portion 29' and its movements thereon will correspond with the movements of the gear 16 on its shaft.

Obviously, where desired, the shafts 29 and 25 may be interchanged so that when it is more convenient the gear 15 may become the driving gear instead of the driven gear, as shown. Such interchange of the drive may be effected either by retaining the shafts 25 and 29 in their respective positions and by interchanging the gears 15 and 16 so as to cause the gear 15 to be supported by the shaft 25, and the gear 16 to be supported by the shaft 29; or by retaining the gears 15 and 16 in their respective positions and by interchanging the shafts 25 and 29. The coupling member 26 is cooperable with the outer end of either of the shafts 25 and 29, and this is also true of the stuffing boxes 32 and 33. This interchangeability of the shafts and gears is desirable both in order to prolong the life of these relatively slidable elements, and in order to reduce the manufacturing cost and facilitate assembly of the pumps since only one type of shaft and one style of gear need be carried in stock.

It should be noted that in the operation of the gear pump for the hoisting cylinders oil enters the gear chambers from the duct 14, which is controlled by a ball check valve 40 and oil may flow through gear openings 41 into the key-ways for the keys 35 and also to the bearings and into the recesses 17 and the bearings. Ultimately, the oil is forced out of the gear chambers through the port 13' and duct 14' to the cylinders.

In Fig. 4 a slight modification of the invention is illustrated wherein the gears 15 and 16 are floatingly mounted on enlarged portions 29' and 25' of the shafts 29'' and 25'' and portions of said shafts adjacent the portions 29' and 25' are journaled in bearing sleeves 42 and 43. Between the ends of the sleeves and the shouldered portions 44 of the shafts in gear face recesses 45, are washers or discs 46. This arrangement, of course, permits relative longitudinal movement between the gears and shafts when the driving shaft exerts a pull or a thrust, and prevents excessive frictional engagement between the faces of the gears and the inner surfaces of the members 11 and 8.

From the foregoing description it will be seen that the improved pump construction for fluid hoists is both simple and novel, and is well adapted for the purposes described.

What is claimed as the invention is:

1. In combination, a casing having a chamber provided with inlet and discharge ports and formed to enclose a pair of intermeshing gears, said casing also having alined bearing recesses in the opposite side walls thereof, parallel interchangeable identical shafts extending through said chamber and having medial enlarged portions disposed between said recesses, bearings for said shafts located within said recesses and adjacent to said shaft enlargements, a gear slidably keyed to each of said shaft enlargements and within said chamber, said gears being of interchangeable identical construction and having intermeshing teeth and being provided with ports extending directly from the medial portions of the toothed peripheries thereof to the driving keys at said shaft enlargements, and driving means interchangeably attachable to either of said shafts.

2. In combination, a casing comprising opposite end sections and an intermediate section cooperating to form a chamber, said end sections having alined bearing recesses therein and one of said sections being provided with inlet and discharge ports, parallel interchangeable shafts extending through said chamber and having medial enlargements disposed between said recesses, bearings for said shafts of greater external diameter than said enlargements and located within said recesses adjacent said enlargements, intermeshing gears slidably keyed to said shaft enlargements and disposed within said chamber, said gears being interchangeable with each other and having ports extending directly from the medial portions of the toothed peripheries thereof to the driving keys at said shaft enlargements, and driving means interchangeably attachable to either of said shafts.

In testimony whereof, we affix our signatures.

JULIUS P. HEIL.
CHARLES G. EISENBERG, Jr.
GEORGE LEO LANDRY.